United States Patent [19]

Fischer et al.

[11] 4,050,202
[45] Sept. 27, 1977

[54] METHOD AND ARRANGEMENT FOR ANCHORING AN OBJECT TO A SUPPORT STRUCTURE

[75] Inventors: Artur Fischer; Klaus Fischer, both of Tumlingen, Germany

[73] Assignee: Artur Fischer, Tumlingen, Waldachtal, Germany

[21] Appl. No.: 725,138

[22] Filed: Sept. 17, 1976

Related U.S. Application Data

[63] Continuation-in-part of Ser. No. 631,153, Nov. 11, 1975.

[30] Foreign Application Priority Data

| Nov. 14, 1974 | Germany | 2453957 |
| May 26, 1975 | Germany | 2523198 |
| June 6, 1975 | Germany | 2525220 |
| June 7, 1975 | Germany | 2525452 |
| June 14, 1975 | Germany | 2526744 |
| June 21, 1975 | Germany | 2527773 |
| Sept. 19, 1975 | Germany | 2541762 |

[51] Int. Cl.² ............................................. E04B 1/41
[52] U.S. Cl. ........................................ 52/127; 52/105; 52/704
[58] Field of Search ................... 52/127, 173, 704, 105

[56] References Cited
U.S. PATENT DOCUMENTS

| 1,564,947 | 12/1925 | Copeman | 52/704 |
| 2,020,908 | 11/1935 | Scammell | 52/105 X |
| 2,092,341 | 9/1937 | De Vries | 52/704 |
| 2,930,199 | 3/1960 | Järund | 52/704 X |
| 3,108,404 | 10/1963 | Lamb | 52/704 X |
| 3,282,015 | 11/1966 | Rohe et al. | 151/14.5 X |
| 3,308,585 | 3/1967 | Fischer | 52/704 X |
| 3,379,019 | 4/1968 | Williams | 52/704 X |
| 3,532,316 | 10/1970 | Mathes | 52/744 |
| 3,566,947 | 3/1971 | Jukes | 85/83 |

*Primary Examiner*—Alfred C. Perham
*Attorney, Agent, or Firm*—Michael J. Striker

[57] ABSTRACT

An anchoring member is inserted into an anchoring hole in a support structure and has transverse dimensions smaller than those of the anchoring hole, and is supported with clearance in such anchoring hole by means of a cap member of ring-shaped configuration which surrounds the anchoring member at the trailing end thereof and closes the open end of the clearance. The anchoring member is of a tubular configuration and is closed at its leading end, an aperture communicating the interior of the anchoring member with the clearance. A body of hardenable material is introduced into the clearance through the aperture and by means of a shielding arrangement accommodated in the interior of the tubular anchoring member and communicating with the aperture. At least a portion of the ring-shaped cap member is at least translucent so that the introduction of the hardenable material into the clearance can be monitored therethrough. A depression, preferably an annular groove, is visible through the translucent portion and has such dimensions that, due to its viscosity, the hardenable material will not be able to penetrate into the depression until after the pressure in the clearance has exceeded a value indicative of the completion of the clearance-filling process. A small-sized opening communicates the clearance with the exterior of the cap member and allows air to escape from the clearance during the clearance-filling operation, while preventing the hardenable material from escaping therethrough until the pressure of the hardenable material has reached a predetermined level.

10 Claims, 1 Drawing Figure

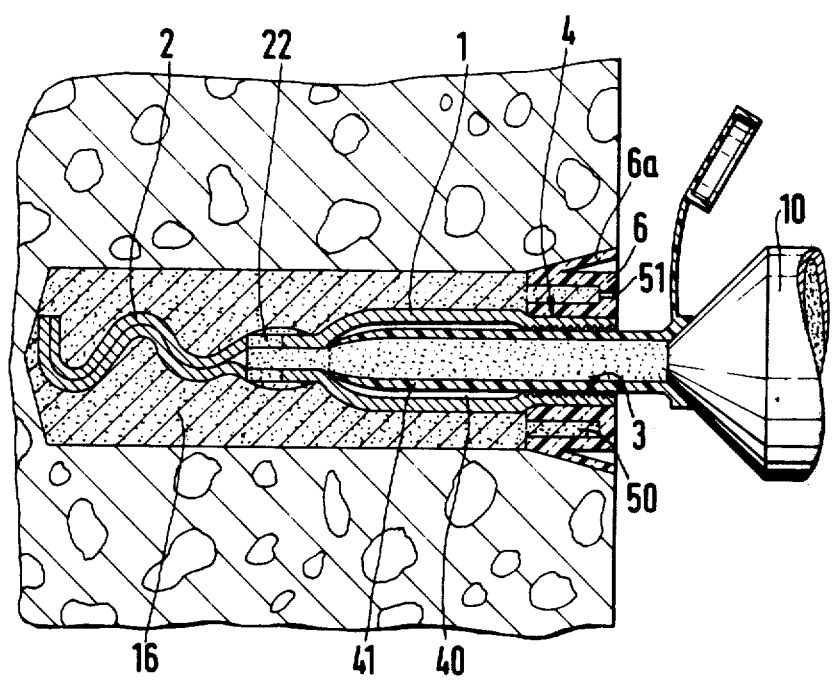

METHOD AND ARRANGEMENT FOR ANCHORING AN OBJECT TO A SUPPORT STRUCTURE

CROSS-REFERENCE TO RELATED APPLICATIONS

This application is a continuation-in-part application of our copending patent application Ser. No. 631,153 filed on Nov. 11, 1975.

BACKGROUND OF THE INVENTION

The present application relates to an arrangement for securing objects to support structures, and more particularly to such an arrangement which is to be anchored in an anchoring hole of the support structure by being embedded in a body of hardenable cementing or other material.

In our copending patent application Ser. No. 631,153, we have disclosed a method of anchoring objects to a support structure and various arrangements which can be used in such a method. Basically, such arrangements each incorporate a sleeve-shaped or tubular anchoring member which has a closed, such as by squeezing, leading end and an open trailing end having an internal thread for threadingly receiving a screw securing the object to the anchoring member and, via the same to the support structure. The anchoring member has such dimensions as to be receivable in an anchoring hole with radial clearance therefrom, and a ring-shaped cap member surrounds the trailing end portion of the anchoring member in the assembled condition, and has such dimensions as to center the anchoring member in the anchoring hole and to sealingly close the open end of the clearance existing between the inner surface of the anchoring hole and the outer surface of the anchoring member. The anchoring element consisting of the anchoring member and of the cap member is provided with at least one aperture through which hardenable material can be introduced into the clearance existing in the anchoring hole after the introduction of the anchoring element thereinto, and the air present in the clearance prior to the commencement of the clearance-filling operation is allowed to escape from such clearance during the introduction of the hardenable material into such clearance through at least one small-sized opening also provided in the anchoring element. When the clearance is filled with the hardenable material and such material hardens about the anchoring member, forming a rigid body thereabout, the latter will securely anchor the anchoring element in the support structure.

In many applications, excellent results are obtained by using the above-discussed arrangements and approach. More particularly, the sealing closing of the open end of the clearance by the cap member, and the provision of the small-sized opening through which the air present in the clearance is permitted to escape therefrom during the clearance-filling operation, render it possible to completely fill the clearance with the hardenable material, under most circumstances, without the formation of any air pockets or air inclusions. By various expedients, also discussed in our above-mentioned copending application, it is possible to so adapt the arrangement that it can be used not only in generally horizontal anchoring holes, but also in anchoring holes which are generally vertical and whose open end faces downwardly. The small-sized opening, while permitting the air to escape, is so located that it is not reached by the viscous hardenable material until the clearance-filling operation is virtually completed, and has such a size that the viscous hardenable material cannot flow therethrough due to its viscosity and due to the surface tension.

As advantageous as these arrangements are, they still do not assure, under some circumstances, complete filling of the clearance, and more particularly, they do not offer any possibility of monitoring or supervising the progress of the clearance-filling operation.

SUMMARY OF THE INVENTION

Accordingly, it is an object of the present invention to improve the arrangements of the prior art.

More particularly, it is an object of the present invention to provide an anchoring arrangement of the type here under consideration in which it is possible to monitor the progress of the clearance-filling operation.

It is a concomitant object of the present invention to provide such an anchoring arrangement which enables the user thereof to determine when the clearance-filling operation is to be terminated upon complete filling of the clearance with the hardenable substance.

Yet another object of the present invention is to provide an arrangement which allows for such monitoring whether used in a substantially horizontal, vertically downward, or overhead anchoring hole.

It is a still further object of the present invention to provide an anchoring arrangement which is capable of indicating the attainment of a predetermined pressure of the hardenable material in the clearance.

In pursuance of these objects and other which will become apparent hereafter, one feature of the present invention resides, in an arrangement for securing an object to a support structure having an anchoring hole, briefly stated, in a combination comprising an anchoring element having one part of transverse dimensions smaller than, and another part of transverse dimensions substantially corresponding to, those of the anchoring hole, the anchoring element being insertable into the anchoring hole through an open end thereof so that the other part of the anchoring element supports the latter at the open end of the anchoring hole with clearance between the anchoring hole and the one part of the anchoring element, the other part of the anchoring element also closing the open end of the above-mentioned clearance upon insertion of the anchoring element thereinto. The combination of the present invention further comprises means for introducing a body of hardenable material into the clearance for hardening therein about the one part of the anchoring element to thereby anchor the anchoring element in the anchoring hole, and means for monitoring the degree of filling of the clearance by the hardenable material, including at least a translucent portion of the other part of the anchoring element through which the clearance and the body of hardenable material being formed therein can be observed. Instead of being translucent, the above-mentioned portion may be transparent.

In a currently preferred embodiment of the present invention, the above-mentioned one part of the anchoring element is constituted by an anchoring member, and the other part of the anchoring member is constituted by a ring-shaped cap member which surrounds a portion of the anchoring member upon assembly therewith. Not only a portion of, but the entire cap member may be of a translucent or transparent material.

In a currently preferred embodiment of the arrangement of the present material, the anchoring member is generally tubular and has a closed leading end and an open trailing end as viewed in the direction of introduction of the anchoring element into the anchoring hole. In this embodiment, the above-mentioned introducing means may include at least one aperture provided in the anchoring member and operative for passage of the hardenable material therethrough from the interior of the anchoring member into the clearance. Preferably, the introducing means further includes shielding means which is insertable into the interior of the anchoring member through the open trailing end thereof to communicate with the above-mentioned aperture, and operative for preventing the hardenable material from filling the interior of the anchoring member around the shielding means. The anchoring member may have an internal thread at the trailing end thereof, the shielding means then preventing the hardenable material from penetrating toward and into the thread.

In this embodiment, the aperture of the tubular anchoring member through which the hardenable material is introduced into the clearance is located close to the leading end of the anchoring member so that, under most circumstances, particularly when the arrangement is used in downwardly directed or even horizontal anchoring hole, the clearance is filled with the hardenable material beginning at the bottom thereof, the upper level of the body of hardenable material gradually progressing toward the open end of the clearance and toward the cap member. No matter what the color of the hardenable material is (usually it will be quite dark), a change in color of the transparent or translucent portion of th cap member will be perceived by the observer of the cap member or of the transparent or translucent portion thereof when the hardenable material reaches the cap member and displaces the air which has been previously present adjacent to the cap member in the interior of the clearance. Thus, the change in color perceivable through the transparent or translucent portion of the cap member will be an indication to the user of the arrangement that the clearance is filled completely with the hardenable material. Such an indication is especially important when the anchoring element is to be anchored in a support structure of foraminous nature, that is a structure which either has large air inclusions therein, or which has internal chambers such a found in building blocks. In such support structures, because of the presence of differently sized air inclusions, air pockets or air chambers in the material of the support structure, the volume which is to be filled with the hardenable material, that is, the clearance and/or such internal inclusions, pockets or chambers which may communicate therewith, will vary from case to case so that it is impossible for the user of the arrangement to estimate or to even feel the amount of the hardenable material to be introduced and the time period for which such introduction is to be conducted. On the other hand, the provision of the transparent or translucent portion on the cap member, or the making of the cap member transparent or translucent in its entirety, renders it possible to accurately determine when the clearance and any other spaces communicating therewith have been completely filled with the hardenable substance so that the clearance-filling operation can be then terminated.

According to a further concept of the present invention, the ring-shaped cap member may have a depression of such dimensions that the hardenable material, due to its viscosity can penetrate into the depression only when the pressure in the clearance reaches a predetermined level. Under these circumstances, the transparent or translucent portion of the cap member will partly bound the depression so as to render it possible to see whether or not the depression has been already filled with the hardenable material.

This embodiment of the present invention is particularly advantageous in view of the fact that the pressure at which the hardenable material is to be introduced into the clearance in order to fill the same depends, first of all, on the diameter and the depth of the anchoring hole, but also to a large extent, on the viscosity of the hardenable material. The dimensions of the depression must be so selected as to permit the penetration of the hardenable material into the depression only when the desired pressure has been achieved in the clearance. So, for instance, when the clearance is rather narrow in the radial direction, and rather long in the axial direction of the anchoring member, the dimensions of the depression must be quite small so that the pressure needed for forcing the hardenable material into the depression will be rather high. Contrary thereto, when the diameter of the anchoring hole is quite large, and so is also the radial dimension of the clearance, and the axial length of the clearance is quite small, that is, when a substantially lower pressure must be achieved in the clearance before filling the same with the hardenable material, the dimensions of the depression will be commensurately larger. In view of the fact that the full injection pressure is achieved in the clearance only after the full filling of the clearance with the hardenable material, the penetration of the hardenable material into the depression will not only give an indication of achievement of the desired pressure in the clearance, but also will give a visual indication of the completion of the filling of the clearance.

This monitoring of the degree of filling of the clearance with the hardenable material by means of detecting the pressure prevailing in the clearance is especially suited for use of the arrangement in overhead anchoring holes, in view of the fact that, under these circumstances, the clearance will start filling at the cap member, despite the introduction of the hardenable material at the leading end of the anchoring member, due to the gravity flow of the hardenable material toward the cap member so that, in those circumstances, the transparency or translucency of at least a portion of the ring-shaped cap member by itself is insufficient for indicating the degree of filling of the clearance with the hardenable material. However, even under these circumstances, the viscous hardenable material will not be able to penetrate into the properly dimensioned depression, inasmuch as a rise of the pressure of the hardenable material is necessary for forcing the hardenable material into the depression. Therefore, this pressure-dependent determination of the degree of filling of the clearance with the hardenable material is particularly reliable when the anchoring arrangement is to be anchored in an overhead anchoring hole.

According to a further concept of the present invention, it has been found to be very advantageous to configurate the depression as an annular groove which surrounds the trailing end of the anchoring member in a coaxial fashion, being provided in the ring-shaped cap member. This configuration not only substantially simplifies the manufacture of the cap member, but also allows for the use of the cap member in any angular position relative to the longitudinal axis of the anchoring element.

In addition to, or instead of, the provision of the depression, the opening which permits the escape of air from the clearance to the exterior of the cap member during the filling of the clearance with the hardenable material may be so dimensioned that it only prevents the escape of hardenable substance therethrough when the pressure of the hardenable substance is below a predetermined threshold value. When this threshold value is exceeded, the hardenable material will appear at the outer end of the opening, which will also give an indication of the achievement of the desired pressure in the clearance, and thus of the fact of complete filling of the clearance with the hardenable substance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE of the drawing illustrates the present invention as embodied in an exemplary anchoring arrangement.

DETAILED DISCUSSION OF THE PREFERRED EMBODIMENT

Referring now to the drawing in detail, it may be seen that it illustrates the present invention as used in one embodiment discussed in more detail in our above-mentioned copending patent application Ser. No. 631,153. While, for the sake of simplicity, the present invention will be discussed only as used in this exemplary embodiment, it is to be understood that the same concept can also be used in the other embodiments described and illustrated in the above-mentioned copending application.

As seen in the drawing, the anchoring arrangement of the present invention includes a tubular anchoring element or dowel 1, the leading end of which is indicated at 2. The leading end 2 is closed, such as by squeezing, and the anchoring element 1 is also shown to include several hook-shaped bends which improve the security with which the anchoring member 1 is held in an anchoring hole 16.

The trailing end of the anchoring member 1, as viewed in the direction of introduction of the anchoring member 1 into the anchoring hole 16, has a reduced diameter, and an internal thread 3 is provided at such trailing end of the anchoring member 1 into which a screw is threaded to secure an object to the anchoring member 1 and thus to the support structure in which the anchoring hole 16 is provided. The reduced diameter trailing end portion is designated with the reference numeral 4, and a ring-shaped cap member 6 is mounted on and surrounds the trailing end portion 4 and serves to close the open end of the clearance present between the outer surface of the anchoring member 1 and the inner surface of the support structure which bounds the anchoring hole 16, when the anchoring element 1, 6 is introduced into the anchoring hole 16. The outer diameter of the ring-shaped cap member 6 is so adjusted to the diameter of the anchoring hole 16 that it is fittingly receivable in the open end of the anchoring hole 16. The ring-shaped cap member 6 is further provided with a sealing portion 6a which assures sealing of the above-mentioned clearance even when the open end of the anchoring hole 16 has been damaged during the drilling of the anchoring hole 16 or subsequently thereto.

Before introducing hardenable material into the clearance between the anchoring member 1 and the surface bounding the anchoring hole 16, a sleeve 41 is introduced into the interior 40 of the tubular anchoring member 1, the leading end of the sleeve 41 sealingly abutting the bottom of the interior 40 of the tubular anchoring member 1. The anchoring member 1 has an aperture 22 close to its leading end and communicating with the sleeve 41 when the latter is introduced into the interior 40 of the anchoring member 1 so that, under these circumstances, an injection apparatus 10 can inject hardenable material into the sleeve 41 through its trailing end, the hardenable material flowing through the sleeve 41, through the aperture 22, of the anchoring member 1, and into the clearance around the anchoring member 1. After the termination of the injecting operation, and after the hardening of the hardenable material, the sleeve 41 is removed from the interior 40 of the tubular anchoring member 1, together with the hardenable material which has hardened within the sleever 41, so that the inner thread 3 is free for threading of a connecting screw thereinto.

In view of the fact that the aperture 22 is arranged at the leading end of the tubular anchoring member 1, the clearance defined in the anchoring hole 16 by the anchoring member 1 will be filled substantially from the bottom of the anchoring hole 16 toward the ring-shaped cap member 6. The ring-shaped cap member 6, or at least a part of it, is either translucent or transparent, so that, when the hardenable material reaches the cap member 6, a change in color will be perceived through the transparent or translucent portion of the ring-shaped cap member 6. Such change in color will indicate to the user of the arrangement the completion of the filling of the clearance in the anchoring hole 16.

The transparency of the cap member 6 can be achieved, on the one hand, by making the entire cap member 6 of a transparent or translucent material. On the other hand, at least the translucency can be achieved by forming the ring-shaped cap member 6 with a depression 50 which may be configurated as an annular groove, the depression 50 extending from the inner surface of the cap member 6 to just short of the external surface of the cap member 6. Because of the relatively small thickness of the material of the cap member 6, at the bottom of the depression 50, there is achieved at least a partial transparency or translucency of the cap member 6.

The dimensions of the depression 50 can be so selected in accordance with well-known principles, in dependence on the viscosity of the hardenable material, that certain pressure must prevail in the clearance before the hardenable material can penetrate into the depression 50. When this expedient is accomplished, it is avoided thereby that the hardenable material could flow into the depression 50 prior to complete filling of the clearance, such as due to gravity, and thus give false indication of the non-existent completion of the filling of the clearance. This is particularly important for use of the anchoring element 1, 6 in overhead anchoring holes 50, where the clearance starts filling with the hardenable material from the cap member 6.

The cap member 6 also has an opening 51 through which air escapes from the clearance as it is displaced by the hardenable material during the introduction of the latter into the clearance. When the hardenable material has a very low viscosity, the indication of the achievement of the predetermined pressure in the clearance can also be obtained by using this opening 51, the cross-section of the venting opening 51 being then so selected in dependence on the pressure which is to prevail in the clearance upon the termination of the injection of the hardenable material thereinto, that the hardenable material will pass through the venting opening 51, but only after the pressure in the clearance around the anchoring member 1 has reached a predetermined level. Thus, the appearance of the low-viscosity hardenable material at the external end of the venting opening 51 will give an indication of the completion of the filling of the clearance defined in the anchoring hole 16 by the anchoring member 1 with the hardenable substance.

It will be understood that each of the elements described above, or two or more together, may also find a useful application in other types of constructions differing from the types described above.

While the invention has been illustrated and described as embodied in an arrangement for securing objects to a support structure, it is not intended to be limited to the details shown, since various modifications and structural changes may be made without departing in any way from the spirit of the present invention.

Without further analysis, the foregoing will so fully reveal the gist of the present invention that others can, by applying curent knowledge, readily adapt it for various applications, without omitting features that, from the standpoint of prior art, fairly constitute essential characteristics of the generic or specific aspects of this invention.

What is claimed as new and desired to be protected by Letters Patent is set forth in the appended claims:

1. An arrangement for securing an object to a support structure having an anchoring hole, comprising an anchoring element having one part of transverse dimensions smaller than, and another part of transverse dimensions substantially corresponding to those of the anchoring hole, said anchoring element being insertable into the anchoring hole through an open end thereof so that said other part supports said anchoring element at the open end of the anchoring hole with clearance between the latter and said one part and closes the open end of said clearance upon insertion; means for introducing a body of hardenable material into said clearance for hardening therein about said one part of said anchoring element to thereby anchor the latter in the anchoring hole; and means for monitoring the degree of filling of said clearance by the hardenable material, including at least a translucent portion of said other part of said anchoring element through which said clearance and said body can be observed.

2. An arrangement as defined in claim 1, wherein said portion is transparent.

3. An arrangement as defined in claim 1, wherein said other part of said anchoring element has a depression of such dimensions that the hardenable material can penetrate thereinto only when the pressure in said clearance reaches a predetermined level; and wherein said portion of said other part of said anchoring member at least partly bounds said depression.

4. An arrangement as defined in claim 3, wherein said depression is configurated as an annular groove in said other part around said one part of said anchoring element.

5. An arrangement as defined in claim 1, wherein said other part of said anchoring element has at least one opening for escape of air from said clearance during the introduction of said body of hardenable material into said clearance; and wherein said opening is so dimensioned that the hardenable material can escape from said clearance through said opening and appear at the exterior of said other part of said anchoring element only after the pressure of the hardenable material in said clearance has reached a predetermined level.

6. An arrangement as defined in claim 1, wherein said one part is constituted by an anchoring member, and said other part by a ring-shaped cap member surrounding a portion of said anchoring member upon assembly therewith.

7. An arrangement as defined in claim 6, wherein said cap member is entirely of an at least translucent material.

8. An arrangement as defined in claim 6, wherein said anchoring member is generally tubular and has a closed leading, and an open trailing end as viewed in the direction of introduction of said anchoring element into the anchoring hole; and wherein said introducing means includes at least one aperture in said anchoring member for passage of the hardenable material therethrough from the interior of said anchoring member into said clearance.

9. An arrangement as defined in claim 8, wherein said introducing means further includes shielding means insertable into the interior of said anchoring member through said open trailing end thereof to communicate with said aperture and operative for preventing the hardenable material from filling the interior of said anchoring member around said shielding means.

10. An arrangement as defined in claim 9, wherein said anchoring member has an internal thread at said trailing end thereof; and wherein said shielding means prevents the hardenable material from penetrating toward and into said thread.

* * * * *